United States Patent [19]

Pearce et al.

[11] 4,258,539
[45] Mar. 31, 1981

[54] GRASS DISCHARGE CHUTE DEFLECTOR FOR ROTARY LAWN MOWER

[75] Inventors: Richard E. Pearce; Ronald M. Stolley, both of Lincoln, Nebr.

[73] Assignee: Outboard Marine Corporation, Waukegan, Ill.

[21] Appl. No.: 70,859

[22] Filed: Aug. 29, 1979

[51] Int. Cl.³ .............................................. A01D 35/26
[52] U.S. Cl. ..................................... 56/320.2; 56/202
[58] Field of Search ..................... 56/202, 320.1, 320.2, 56/16.6, 17.5

[56] References Cited

U.S. PATENT DOCUMENTS 3,696,595  10/1972  Dahl .................................... 56/320.2

*Primary Examiner*—Jay N. Eskovitz

[57] ABSTRACT

A lawn mower comprises a housing enclosing a rotary cutting blade. The housing includes a continuous sidewall having therein a side grass discharge opening and a top wall extending from the sidewall and having therein a top grass discharge opening. A deflector is located on the housing adjacent to the side discharged opening and is operative for movement between an open position permitting the escape of grass clippings through the side discharge opening and a closed position blocking the escape of grass clippings through the side discharge opening. The deflector is biased toward the open position. A grass discharge chute is detachably attached on the housing in communication with the top discharge opening. The chute includes a tab member which engages the deflector and moves the deflector from its open position to its closed position against the action of the bias during attachment of the grass discharge chute on the housing. The tab member also maintains the deflector in its closed position against the action of the bias when the grass discharge chute is attached on the housing.

3 Claims, 4 Drawing Figures

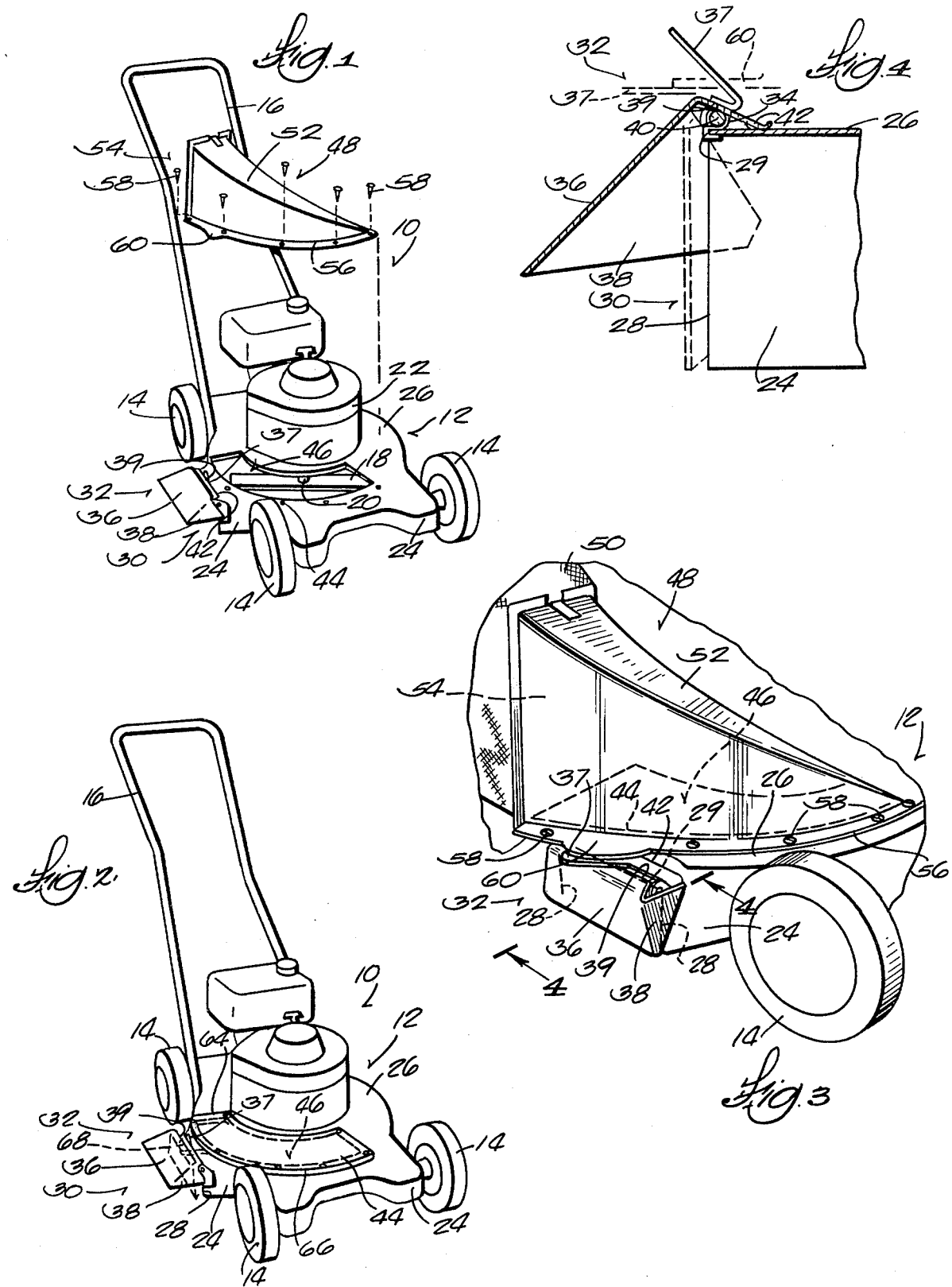

GRASS DISCHARGE CHUTE DEFLECTOR FOR ROTARY LAWN MOWER

FIELD OF THE INVENTION

The invention relates generally to rotary type lawn mowers. More particularly, the invention relates to grass discharge chute deflectors for rotary type lawn mowers.

DESCRIPTION OF THE PRIOR ART

Attention is directed to the following United States patents which disclose rotary lawn mowers with associated grass discharge deflector assemblies:

| Thelander | 2,802,327 | August 13, 1957 |
| --- | --- | --- |
| Shaw | 3,065,588 | November 27, 1962 |
| Shaw | 3,118,267 | January 21, 1964 |
| Shaw | 3,134,214 | May 26, 1964 |
| Siwek | 3,423,918 | January 28, 1969 |
| Ramey | 3,673,778 | July 4, 1972 |
| Taub | 3,706,190 | December 19, 1972 |
| Cope | 3,726,069 | April 3, 1973 |
| Marion et al | 3,760,572 | September 25, 1973 |
| Erdman et al | 3,797,214 | March 19, 1974 |
| Woelffer et al | 3,805,499 | April 23, 1974 |
| Finneran | 3,828,533 | August 13, 1974 |
| Dahl | 3,872,656 | March 25, 1975 |
| Lessig et al | 4,008,559 | February 22, 1977 |
| Gobin | 4,031,694 | June 28, 1977 |

SUMMARY OF THE INVENTION

The invention provides a lawn mower comprising a housing enclosing a rotary cutting blade and including a continuous sidewall having therein a side grass discharge opening. A top wall extends from the sidewall and has therein a top grass discharge opening. Deflector means is located on the housing adjacent to the side discharge opening and is operative for movement between an open position which permits the escape of grass clippings through the side discharge opening and a closed position which blocks the escape of grass clippings through the side discharge opening. Means is operatively connected with the deflector means for biasing the deflector means toward the open position. A grass discharge chute is detachably attached on the housing in communication with the top discharge opening and includes means which engages the deflector means for moving the deflector means from the open position to the closed position against the action of the biasing means during attachment of the grass discharge chute on the housing and which maintains the deflector means in the closed position against the action of the biasing means when the grass discharge chute is attached on the housing. Thus, when the grass discharge chute is attached on the housing, substantially all of the grass clippings are directed outwardly of the housing through the discharge chute in response to cutting blade rotation.

In accordance with one embodiment of the invention, the lawn mower further includes a cover plate which is adapted to be detachably attached on the housing in covering relation to the top discharge opening when the grass discharge chute is not attached. The cover plate prevents the escape of grass clippings through the top discharge opening.

In accordance with one embodiment of the invention, the cover plate includes means engaging the deflector means for moving the deflector means from the open position to the closed position against the action of the biasing means during attachment of the cover plate on the housing and for maintaining the deflector means in the closed position against the action of the biasing means when the cover plate is attached on the housing. When the cover plate is attached in this fashion, the lawn mower acts as a mulching type lawn mower.

One of the principal features of the invention is the provision of a rotary lawn mower which is alternately operable as a chuteless grass mulching mower, in which the grass clippings are mulched by the cutting blade and discharged below the lawn mower housing, or as a lawn mower having an associated grass discharge chute, in which the grass clippings are discharged outwardly of the housing through the grass discharge chute, or as a lawn mower in which grass clippings are discharged through a side discharge opening in the lawn mower housing.

Other features and advantages of the embodiments of the invention will become known by reference to the following general description, claims, and drawings.

DESCRIPTION OF THE DRAWINGS

FIG. 1 is an exploded perspective view of a rotary lawn mower having a detachable grass discharge chute shown in a detached position from the lawn mower;

FIG. 2 is a perspective view of the rotary lawn mower shown in FIG. 1 with a detachable cover plate attached in place of the grass discharge chute;

FIG. 3 is an enlarged view of the detachable grass discharge chute shown in an attached position on the lawn mower; and FIG. 4 is a sectional view of the grass discharge chute deflector which is associated with the lawn mower shown in FIG. 1 and which is taken generally along line 4—4 of FIG. 3.

Before explaining the embodiments of the invention in detail, it is to be understood that the invention is not limited in its application to the details of construction and the arrangement of components set forth in the following description and as illustrated in the drawings. The invention is capable of other embodiments and of being practiced and carried out in various ways.

DESCRIPTION OF THE PREFERRED EMBODIMENT

Shown in the drawings is a lawn mower 10 which includes a housing 12 supported by wheels 14 for movement over the ground. Lawn mower movement is controlled by pushing on a handle 16 which extends upwardly and rearwardly from the housing 12. Grass is cut by a rotary cutting blade 18 (see FIG. 1) which is supported within the housing 12 on the drive shaft 20 of an engine 22 mounted on the housing 12.

The housing 12 includes a continuous sidewall 24 and a top wall 26 which extends from the sidewall 24. The sidewall 24 includes adjoining vertical and horizontal edges 28 and 29 which define an opening 30 through which airborne grass clippings may be discharged from the housing 12 in response to cutting blade rotation.

Deflector means 32 is located on the housing 12 adjacent to the side discharge opening 30. The discharge means 32 is operative for movement between an open position (shown in solid lines in FIGS. 1, 2 and 4) and a closed position (shown in phantom lines in FIGS. 2 and 4 and solid lines in FIG. 3). As is shown in FIG. 4, means in the form of a spring 34 is operatively connected with the deflector means 32 for biasing the deflector 32 toward the open position.

When the deflector means 32 is in its normally open position, the escape of airborne grass clippings through the side discharge opening 30 is permitted. When the deflector means 32 is in its closed position, the escape of airborne grass clippings through the side discharge opening 30 is blocked.

While the deflector means 32 may be variously constructed, in the illustrated embodiment, a deflector shield 36 is provided which includes a lip 37 which extends laterally outwardly from the upper edge 39 of the shield 36 and which generally overhangs the exterior surface of the shield 36 (as is best shown in FIGS. 3 and 4). The shield 36 also includes integrally connected sidewalls or wings 38. These wings 38 are spaced apart so as to be in substantial alignment with the vertical edges 28 of the discharge opening 30 (see FIG. 3). The shield 36 is pivotally attached on the housing 12 by means of a shaft 40 which extends along the upper horizontal edge 29 of the opening 30.

A stop tab 42 (see FIG. 4) extends laterally outwardly from the upper edge 39 of the shield 36. The tab 42 rests against the housing top wall 26 when the deflector shield 36 is in the position shown in solid lines in FIG. 4 and limits further pivotal movement of the deflector shield 36 upwardly beyond this position. When in this position, which corresponds to the heretofore described open position of the deflector means 32, the deflector shield 36 extends at an angle outwardly from the housing sidewall 24. The escape of grass clippings through the opening 30 is permitted. At the same time, grass clippings, stones or other debris struck by the cutting blade 18 are deflected by the shield 36 downwardly toward the ground and away from the operator and bystanders.

When the deflector means 32 is in the heretofore described closed position (as is best shown in FIG. 3 and in phantom lines in FIG. 4), the deflector shield 36 is in covering relation to the side discharge opening 30 with the wings 38 registering with the vertical edges 28 of the side discharge opening 30 to completely block the side discharge opening 30.

Top wall 26 includes edges 44 (see FIGS. 1 and 2) which define an opening 46 in the top wall 26. As can be seen in FIGS. 1 and 3, a grass discharge chute 48 may be detachably attached on the housing 12 in communication with the top discharge opening 46 so that orbiting grass clippings may be discharged outwardly of the housing 12 through the discharge chute 48 in response to cutting blade rotation.

While various constructions are possible, in the illustrated embodiment (and still referring to FIGS. 1 and 3), the grass discharge chute 48 includes a main body portion 52 which is generally curved radially outwardly of the engine 22 and which has a rearwardly facing discharge opening 54 which preferably empties into a grass discharge bag 50 (as shown in FIG. 3) suitably supported on the lawn mower housing 12. The main body portion 52 of the chute 48 includes at the bottom thereof a peripheral edge 56 which defines an inlet opening and which is adapted to fit in sealing registry with the edges 44 which define the top discharge opening 46 (see FIG. 3). Threaded bolts 58 or the like secure the peripheral edge 56 of the grass discharge chute 48 to the housing 12.

The grass discharge chute 48 includes means 60 which engages the deflector means 32 and moves the deflector means 32 from its open position to its closed position against the action of the biasing spring 34 during attachment of the grass discharge chute 48 on the housing 12. In addition, the means 60 maintains the deflector means 32 in its closed position against the action of the biasing spring 34 when the grass discharge chute 48 is bolted to the housing 12. By virtue of this arrangement, substantially all of the grass clippings are directed outwardly through the chute 48.

While various constructions are possible, in the illustrated embodiment, the means 60 takes the form of a tab which projects laterally outwardly from the peripheral edge 56 of the main body portion 52 of the chute 48. As is shown in FIGS. 3 and 4, this tab 60 contacts the lip 37 of the deflector shield 36 when the chute 48 is properly positioned on the housing 12. Engagement between the tab 60 and the deflector lip 37 during attachment of the chute 48 on the housing 12 moves the deflector shield 36 against the action of the biasing spring 34 from its open position to its closed position. Furthermore, when the chute 48 is bolted on the housing 12, the engagement between the tab 60 and the deflector lip 37 maintains the deflector shield 36 in its closed position (as is shown in FIG. 3 and in phantom lines in FIG. 4).

As can be seen in FIG. 2, the lawn mower 10 also includes a cover plate 64 which is adapted to be detachably attached on the housing 12 in covering relation to the top discharge opening 46 when the grass discharge chute 48 is not attached. The cover plate 64 thus prevents the escape of grass clippings through the top discharge opening 54, and the flow of airborne grass clippings proceeds outwardly of the housing through the normally open side discharge opening 30.

The construction of the cover plate 64 is similar to the construction of the chute 48. More particularly, the cover plate 64 includes a peripheral edge 66 which is adapted to fit in sealing registry with the edges 44 which define the top discharge opening 46. Also, like the heretofore described chute 48, the cover plate 64 is bolted in position upon the housing 12 of the lawn mower 10.

In an alternate embodiment, and as can be seen in phantom lines in FIG. 2, the cover plate 64, like the heretofore described grass discharge chute 48, may include means 68 which engages the deflector means 32 and moves the deflector means 32 from its normally biased open position to its closed position against the action of the biasing spring 34 during attachment of the cover plate 64 on the housing 12. Furthermore, the means 68 subsequently maintains the deflector means 32 in its closed position against the action of the biasing spring 34 when the cover plate 64 is bolted on the housing 12.

More particularly, the cover plate 64, like the grass discharge chute 48, includes a tab 68 which projects laterally outwardly beyond its peripheral edge 66 and contacts the deflector lip 37 in the same fashion as the tab 60 of the grass discharge chute 48. In this alternate embodiment, when the cover plate 64 is attached on the housing 12, the grass discharge deflector 32 is maintained in its closed position (as is shown in phantom lines in FIG. 2). With the cover plate 64 thus attached, the lawn mower 10 operates as a chuteless grass mulching mower.

Various of the features of the invention are set forth in the following claims.

We claim:

1. A lawn mower comprising a housing enclosing a rotary cutting blade and including a continuous sidewall having therein a side grass discharge opening and a top wall extending from said sidewall and having therein a top grass discharge opening, deflector means on said housing adjacent to said side discharge opening and operative for movement between an open position permitting the escape of grass clippings through said side discharge opening and a closed position blocking the escape of grass clippings through said side discharge opening, means operatively connected with said deflector means for biasing said deflector means toward said open position, and a grass discharge chute detachably attached on said housing in communication with said top discharge opening and including means engaging said deflector means for moving said deflector means from said open position to said closed position against the action of said biasing means during attachment of said grass discharge chute on said housing and for maintaining said deflector means in said closed position against the action of said biasing means when said grass discharge chute is attached on said housing.

2. A lawn mower according to claim 1 and further including a cover plate adapted to be detachably attached on said housing in covering relation to said top discharge opening when said grass discharge chute is not attached for preventing the escape of grass clippings through said top discharge opening, said cover plate including means engagine said deflector means for moving said deflector means from said open position to said closed position against the action of said biasing means during attachment of said cover plate on said housing and for maintaining said deflector means in said closed position against the action of said biasing means when said cover plate is attached on said housing.

3. A lawn mower according to claim 1 and further including a cover plate adapted to be detachably attached on said housing in covering relation to said top discharge opening when said grass discharge chute is not attached for preventing the escape of grass clippings through said top discharge opening.

* * * * *